US009905848B2

United States Patent
Ko et al.

(10) Patent No.: US 9,905,848 B2
(45) Date of Patent: Feb. 27, 2018

(54) NEGATIVE ACTIVE MATERIAL FOR RECHARGEABLE LITHIUM BATTERY, NEGATIVE ELECTRODE FOR RECHARGEABLE LITHIUM BATTERY INCLUDING SAME AND RECHARGEABLE LITHIUM BATTERY INCLUDING SAME

(71) Applicant: SAMSUNG SDI CO., LTD., Yongin-si, Gyeonggi-do (KR)

(72) Inventors: Seongjae Ko, Yongin-si (KR); Jae Hou Nah, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/239,814

(22) Filed: Aug. 17, 2016

(65) Prior Publication Data

US 2017/0133679 A1    May 11, 2017

(30) Foreign Application Priority Data

Nov. 10, 2015   (KR) ........................ 10-2015-0157537

(51) Int. Cl.
  *H01M 4/36*    (2006.01)
  *H01M 4/133*   (2010.01)
  *H01M 4/583*   (2010.01)
  *H01M 10/0525* (2010.01)
  *H01M 4/587*   (2010.01)

(52) U.S. Cl.
  CPC ........... *H01M 4/366* (2013.01); *H01M 4/133* (2013.01); *H01M 4/583* (2013.01); *H01M 4/587* (2013.01); *H01M 10/0525* (2013.01)

(58) Field of Classification Search
  CPC .. H01M 4/583; H01M 4/133; H01M 10/0525; H01M 4/366; H01M 4/587
  See application file for complete search history.

(56) References Cited

U.S. PATENT DOCUMENTS

| 2009/0191462 A1 | 7/2009 | Matsui et al. |
| 2011/0236767 A1 | 9/2011 | Sotowa et al. |
| 2012/0288766 A1 | 11/2012 | Lee et al. |

FOREIGN PATENT DOCUMENTS

| CN | 103346294 | * | 10/2013 |
| CN | 103794765 | * | 5/2014 |
| JP | 09035752 | * | 2/1997 |
| JP | 2002-289190 A | | 10/2002 |
| JP | 2014-060176 A | | 4/2014 |
| KR | 10-2003-0087986 A | | 11/2003 |
| KR | 10-2009-0077717 A | | 7/2009 |
| KR | 10-2009-0111289 A | | 10/2009 |
| KR | 10-1182433 B1 | | 9/2012 |
| KR | 10-1417588 B1 | | 7/2014 |
| KR | 10-2014-0127043 A | | 11/2014 |
| KR | 10-1522911 B1 | | 5/2015 |
| WO | WO 2012-091515 A2 | | 7/2012 |

* cited by examiner

*Primary Examiner* — Laura Weiner
(74) *Attorney, Agent, or Firm* — Lewis Roca Rothgerber Christie LLP

(57) ABSTRACT

A negative active material for a rechargeable lithium battery includes a carbon-based material and has a specific surface area of less than or equal to about 1 m²/g, and an area ratio D/G of a ID peak at about 1350 cm$^{-1}$ to about 1370 cm$^{-1}$ and a G peak at about 1570 cm$^{-1}$ to about 1620 cm$^{-1}$ of less than or equal to about 0.3 in a Raman spectrum analysis and includes a carbon-based material.

5 Claims, 2 Drawing Sheets

NEGATIVE ACTIVE MATERIAL FOR RECHARGEABLE LITHIUM BATTERY, NEGATIVE ELECTRODE FOR RECHARGEABLE LITHIUM BATTERY INCLUDING SAME AND RECHARGEABLE LITHIUM BATTERY INCLUDING SAME

RELATED APPLICATIONS

This application claims priority to and the benefit of Korean Patent Application No. 10-2015-0157537 filed in the Korean Intellectual Property Office on Nov. 10, 2015, the entire contents of which are incorporated herein by reference.

BACKGROUND

1. Field

A negative active material for a rechargeable lithium battery, a negative electrode for a rechargeable lithium battery including the same, and a rechargeable lithium battery including the same are disclosed.

2. Description of the Related Art

Rechargeable lithium batteries have recently drawn attention as power sources for small portable electronic devices. A rechargeable lithium battery uses an organic electrolyte solution and thereby, has twice or more high discharge voltage than that of a battery that uses an alkali aqueous solution and as a result, has high energy density.

As for positive active materials of a rechargeable lithium battery, a lithium-transition metal oxide having a structure being capable of intercalating lithium ions, such as $LiCoO_2$, $LiMn_2O_4$, $LiNi_{1-x}Co_xO_2$ (0<x<1), and the like may be used.

As for negative active materials, various carbon-based materials such as artificial graphite, natural graphite, and hard carbon that may intercalate and deintercalate lithium ions have been used. Recently, in order to obtain high capacity, research on silicon-based and tin-based non-carbon-based negative active materials has actively been conducted.

SUMMARY

One aspect of an embodiment provides a negative active material for a rechargeable lithium battery having high temperature performance, a high current density, and a high active mass density.

Another aspect of an embodiment provides a negative electrode for a rechargeable lithium battery including the negative active material.

Yet another aspect of an embodiment provides a rechargeable lithium battery including the negative electrode.

One embodiment provides a negative active material for a rechargeable lithium battery having a specific surface area of less than or equal to about 1 $m^2/g$, an area ratio (D/G) of a D peak (about 1350 $cm^{-1}$ to about 1370 $cm^{-1}$) and a G peak (about 1570 $cm^{-1}$ to about 1620 $cm^{-1}$) of less than or equal to about 0.3 in a Raman spectrum analysis, and including a carbon-based material.

The specific surface area of the negative active material may be about 0.1 $m^2/g$ to about 1 $m^2/g$.

The area ratio (D/G) may be about 0.03 to about 0.3.

In one embodiment, the carbon-based material may include a pitch-coated crystalline carbon-based material. The crystalline carbon-based material may include artificial graphite.

Another embodiment provides a negative electrode for a rechargeable lithium battery including the negative active material.

Yet another embodiment provides a rechargeable lithium battery including the negative electrode; a positive electrode including a positive active material; and an electrolyte.

Other embodiments are included in the following detailed description.

The negative active material for a rechargeable lithium battery according to one embodiment provides a negative electrode for a rechargeable lithium battery having high temperature performance, a high current density, and high active mass density.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
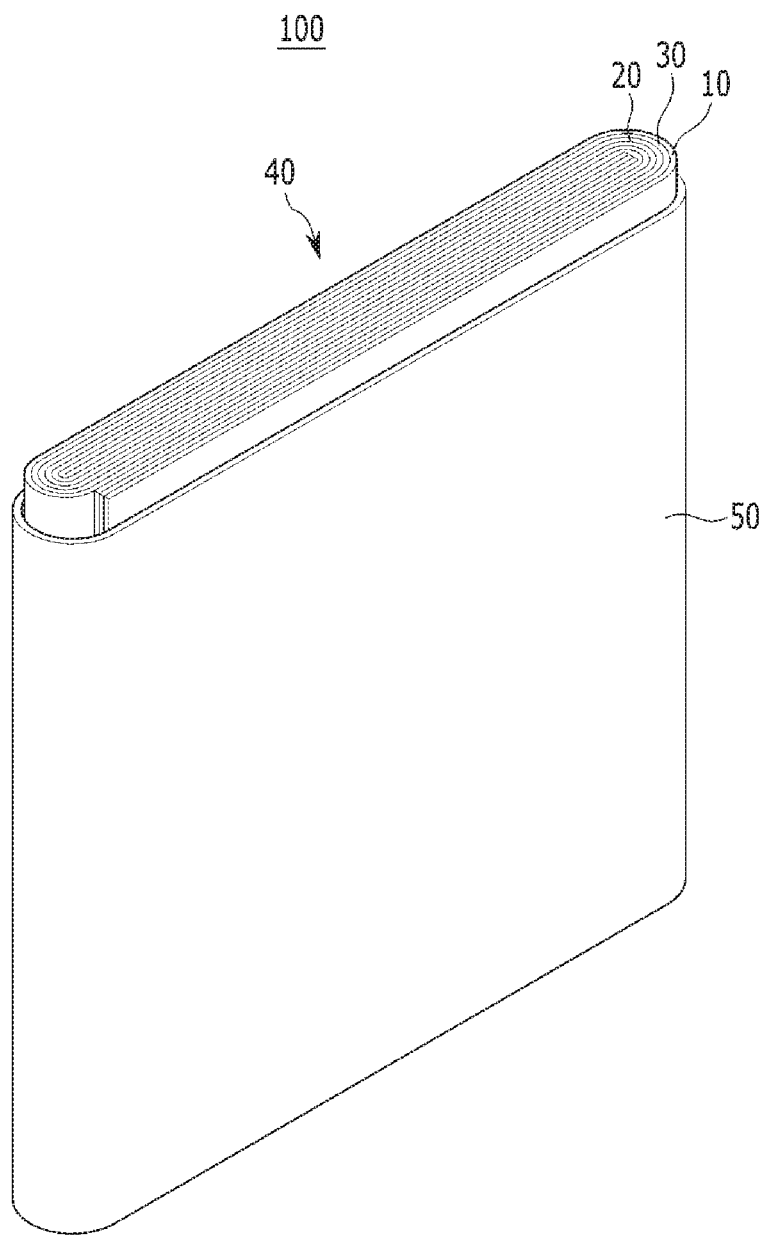
FIG. 1 is a schematic perspective view showing a structure of a positive active material according to one embodiment.

Exemplary embodiments will hereinafter be described in more detail. However, these embodiments are exemplary, and this disclosure is not limited thereto. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

A negative active material for a rechargeable lithium battery according to one embodiment has a specific surface area of less than or equal to about 1 $m^2/g$, an area ratio (D/G) of a D peak (about 1350 $cm^{-1}$ to about 1370 $cm^{-1}$) and a G peak (about 1570 $cm^{-1}$ to about 1620 $cm^{-1}$) of less than or equal to about 0.3 in a Raman spectrum analysis, and includes a carbon-based material.

The negative active material may have a specific surface area of less than or equal to about 1 $m^2/g$. For example, the negative active material may have a specific surface area of about 0.1 $m^2/g$ to about 1 $m^2/g$. When the negative active material has a specific surface area of less than or equal to about 1 $m^2/g$, almost no side reaction may occur, and thus excellent cell characteristics at a high temperature may be obtained.

The specific surface area may be measured using a BET method using nitrogen gas adsorption.

The negative active material may have an area ratio (D/G) of a D peak (about 1350 $cm^{-1}$ to about 1370 $cm^{-1}$) and a G peak (about 1570 $cm^{-1}$ to about 1620 $cm^{-1}$) of less than or equal to about 0.3 in the Raman spectrum analysis. For example, the area ratio (D/G) of the D peak to the G peak may be about 0.03 to about 0.3 in the Raman spectrum analysis. The Raman spectrum area ratio (D/G) indicates a ratio of the D, which is a peak present in a range of about 1350 cm$^{-1}$ to about 1370 cm$^{-1}$, relative to the G, which is a peak present in a range of about 1570 cm$^{-1}$ to about 1620 cm$^{-1}$ in the Raman spectrum analysis. Thus, in some embodiments, the area ratio (D/G) is a value of an area of the peak of D divided by an area of the peak of G.

When the Raman spectrum area ratio (D/G) is within the range, an edge region having very high reactivity at a high temperature is converted into a basal plane having low reactivity at a high temperature, and thus, stability of the negative active material at a high temperature may be improved.

The Raman spectrum is measured by using a laser light source such as, for example, a laser light source that includes an argon ion laser that emits light at a wavelength of about 514 nm. In general, a Raman spectrum may be interpreted as a height ratio (an intensity ratio) or an integral area ratio of peaks obtained therefrom, and in one embodiment of the present disclosure, the Raman spectrum is regarded as an integral area ratio. In some embodiments, the integral area ratio is a ratio of the integral area of the peak appearing at about 1350 cm$^{-1}$ to about 1370 cm$^{-1}$ (the D peak) relative to the integral area of the peak appearing at about 1570 cm$^{-1}$ to about 1620 cm$^{-1}$ (the G peak).

In this way, the negative active material according to one embodiment shows a set (or particular) specific surface area and a set (or particular) Raman spectrum ratio and thus has very low reactivity at a high temperature when these two properties are all suitable or satisfied and resultantly, may provide a battery having very excellent battery properties at a high temperature such as, for example, excellent high temperature cycle-life characteristics.

The negative active material may include a pitch-coated crystalline carbon-based material as the carbon-based material. The crystalline carbon-based material may include artificial graphite. This artificial graphite may include a mesocarbon microbead and/or a flake-shaped and/or particle-shaped artificial graphite assembly.

The flake-shaped and/or particle-shaped artificial graphite assembly may include a non-orientable assembly in which flake-shaped and/or particle-shaped artificial graphite is agglomerated. This non-orientable assembly in which the flake-shaped graphite is agglomerated may include a secondary particle obtained by agglomerating chunk (primary) particles in which graphene are stacked. The graphene may include or consist of graphite.

In the pitch-coated crystalline carbon-based material, the pitch may be continuously present on the surface (a layer shape) or uncontinuously (discontinuously) present (e.g., the pitch may have an island shape such as, for example, a plurality of discontiguous islands including the pitch).

According to one embodiment, the negative active material may be prepared according to the following process.

The carbon-based material (e.g., the crystalline carbon-based material) is mixed with the pitch. The carbon-based material (e.g., the crystalline carbon-based material) and the pitch may be mixed in or to a ratio of about 99:1 to about 95:5 wt %, but the present disclosure is not limited thereto. After mixing the pitch with the carbon-based material (e.g., the crystalline carbon-based material), this mixture is heat-treated at a temperature greater than or equal to about 1500° C. For example, the mixture may be heat-treated at a temperature of about 1500° C. to about 3000° C. for about 12 hours to about 24 hours. The heat treatment may be performed in a condition in which oxygen is blocked (e.g., under conditions free or substantially free of oxygen). For example, the heat treatment may be performed while the mixture is under an inert atmosphere. Through the heat treatment, the surface of the resultant may be crystalized, and a surface functional group may disappear therefrom (e.g., the surface functional group may be eliminated). When the heat treatment is performed at a temperature of less than about 1500° C., the area ratio (D/G) may be increased. The process may provide a pitch-coated crystalline carbon-based material.

The mixing process of the crystalline carbon-based material with the pitch may decrease the specific surface area of the crystalline carbon-based material and, for example, when the mixing ratio is within the foregoing range, a negative active material having a suitable or desired specific surface area may be effectively prepared.

The crystalline carbon-based material may include artificial graphite, and this artificial graphite may include a mesocarbon microbead and/or a flake-shaped or particle-shaped artificial graphite assembly. The pitch may include coal pitch and/or petroleum pitch.

The flake-shaped and/or particle-shaped artificial graphite assembly may include a flake-shaped and/or particle-shaped artificial graphite primary particle and/or a secondary particle obtained by agglomerating a raw material of the primary particle through an assembly process using pitch. For example, the carbon-based material may include flake-shaped and/or particle-shaped artificial graphite primary particles and/or secondary particles. The pitch for the assembly may be used in an amount of about 10 wt % to about 20 wt % based on 100 wt % of the primary particles.

The raw material may include petroleum and/or coke extracted from char coal. For example, the coke extracted from char coal may include needle coke, shot coke, mosaic coke, and the like.

The agglomerating process may first include a stirring process. Through this stirring process, the crystalline carbon-based raw material and/or crystalline carbon-based material may be agglomerated. Subsequently, the stirred product is heated at about 500° C. to about 1000° C. to maintain its shape and then, at about 2500° C. to about 3000° C. for graphitization, thereby obtaining an artificial graphite assembly.

Another embodiment provides a negative electrode including the negative active material. The negative electrode includes a negative electrode active mass layer including the negative active material and a current collector supporting the negative electrode active mass layer.

The negative electrode may have an active mass density of greater than or equal to about 1.65 g/cc. For example, the negative electrode may have an active mass density of about 1.70 g/cc to about 1.85 g/cc. In addition, the negative electrode may have a current density of greater than or equal to about 3.2 mAh/cm$^2$. For example, the negative electrode may have a current density of about 3.2 mAh/cm$^2$ to about 4.2 mAh/cm$^2$.

In the present specification, active mass indicates a mixture of an active material, a binder, and optionally, a conductive material. The mixture is mixed in a solvent, thereby preparing an active material composition in a form of slurry. The active material composition slurry is coated on a current collector and dried to form an active material layer, and herein, this active material layer is referred to as an active mass layer. The terms "active mass" and "active mass layer," as used herein, have the same meaning as generally understood by those of ordinary skill in the art to which the present disclosure belongs, and therefore, further definition thereof is not necessary.

In addition, active mass density indicates an active mass weight per an electrode unit volume.

The negative electrode active mass layer includes a binder and may optionally include a conductive material.

Herein, in the negative electrode active mass layer, an amount of the negative active material may be about 95 wt % to about 99 wt % based on the total weight of the negative electrode active mass layer.

In the negative electrode active mass layer, an amount of the binder may be about 1 wt % to about 5 wt % based on the total weight of the negative electrode active mass layer. When the negative electrode active mass layer further includes the conductive material, it may include about 90 wt % to about 98 wt % of the negative active material, about 1 wt % to about 5 wt % of the binder, and about 1 wt % to about 5 wt % of the conductive material, each wt % being based on the total weight of the negative electrode.

The binder improves binding properties of negative active material particles with one another and with a current collector. The binder includes a non-water-soluble binder, a water-soluble binder, or a combination thereof. As used herein, the terms "combination thereof" and "combinations thereof" may refer to a chemical combination (e.g., an alloy or chemical compound), a mixture, or a laminated structure of components.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a rubber-based binder and/or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, ethylene-propylene copolymer, polyethylene oxide, polyvinylpyrrolidone, polyepichlorohydrine, polyphosphazene, polyacrylonitrile, polystyrene, an ethylene-propylene-diene copolymer, a polyvinylpyridine, chlorosulfonated polyethylene, a latex, a polyester resin, an acrylic resin, a phenol resin, an epoxy resin, polyvinyl alcohol, and a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, and/or alkali metal salts thereof. The alkali metal may be Na, K, or Li. The cellulose-based compound may be included in an amount of about 0.1 parts by weight to about 3 parts by weight based on 100 parts by weight of the negative active material.

The conductive material is included to provide electrode conductivity. Any suitable electrically conductive material may be used as a conductive material unless it causes an undesirable or unsuitable chemical change in the battery or a component thereof. Examples of the conductive material include a carbon-based material such as natural graphite, artificial graphite, carbon black, acetylene black, ketjen black, a carbon fiber and the like; a metal-based material of metal powder or metal fiber including copper, nickel, aluminum, silver, and the like; a conductive polymer such as a polyphenylene derivative; and a mixture thereof.

The current collector may include one selected from a copper foil, a nickel foil, a stainless steel foil, a titanium foil, a nickel foam, a copper foam, a polymer substrate coated with a conductive metal, and a combination thereof.

Another embodiment provides a rechargeable lithium battery including the negative electrode, a positive electrode including a positive active material and an electrolyte.

The positive electrode may include a positive current collector and a positive active material layer formed on the positive current collector. The positive active material may include lithiated intercalation compounds that reversibly intercalate and deintercalate lithium ions. For example, a composite oxide including at least one selected from cobalt, manganese, nickel, and a combination thereof, and lithium may be used. Examples may include compounds represented by the following chemical formulae:

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0 \leq b \leq 0.5$, $0 \leq c \leq 0.05$); $Li_aE_{2-b}X_bO_{4-c}D_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 \leq \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 \leq \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no or substantially no adverse influence on properties of a positive active material by using these elements in the compound. For example, the method may include spray coating, dipping, and/or the like. The method may include any suitable coating method available in the art, and therefore, further description thereof is not necessary.

In the positive electrode, an amount of the positive active material may be about 90 wt % to about 98 wt % based on the total weight of the positive active material layer.

In one embodiment, the positive active material layer may further include a binder and a conductive material. Herein, the binder and conductive material may be respectively included in an amount ranging from about 1 to about 5 wt % based on the total weight of the positive active material layer.

The binder improves binding properties of positive active material particles with one another and with a current collector. Examples thereof include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and the like, but are not limited thereto.

The conductive material improves conductivity of an electrode. Any suitable electrically conductive material may be used as a conductive material, unless it causes an unsuitable or undesirable chemical change in the battery or a component thereof. Examples of the conductive material may include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

The current collector may include Al, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include, for example, methylacetate, ethylacetate, n-propylacetate, dimethylacetate, methylpropionate, ethylpropionate, γ-butyrolactone, decanolide, valerolactone, mevalonolactone, caprolactone, and/or the like. The ether-based solvent may include dibutylether, tetraglyme, diglyme, dimethoxyethane, 2-methyltetrahydrofuran, tetrahydrofuran, and/or the like. The ketone-based solvent may include cyclohexanone, and/or the like. The alcohol-based solvent may include ethanol, isopropyl alcohol, and/or the like, and the aprotic solvent may include nitriles such as R—CN (wherein R is a C2 to C20 linear, branched, or ring structured hydrocarbon group, or may include a double bond, an aromatic ring or an ether bond), and/or the like, amides such as dimethylformamide, dioxolanes such as 1,3-dioxolane, sulfolanes, and/or the like.

The organic solvent may be used singularly or in a mixture. When the organic solvent is used in a mixture, the mixture ratio may be controlled in accordance with a suitable or desirable battery performance.

The carbonate-based solvent may include a mixture of a cyclic carbonate and a linear carbonate. The cyclic carbonate and linear carbonate are mixed together in a volume ratio of about 1:1 to about 1:9. When the mixture is used as an electrolyte, it may have enhanced performance.

The organic solvent may further include an aromatic hydrocarbon-based organic solvent in addition to the carbonate-based solvent. The carbonate-based solvent and aromatic hydrocarbon-based solvent may be mixed together in or to a volume ratio of about 1:1 to about 30:1.

The aromatic hydrocarbon-based organic solvent may be an aromatic hydrocarbon-based compound represented by Chemical Formula 1.

Chemical Formula 1

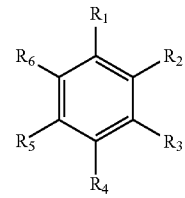

In Chemical Formula 1, $R^1$ to $R^6$ are the same or different and are selected from hydrogen, a halogen, a C1 to C10 alkyl group, a haloalkyl group, and a combination thereof.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-dliodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-dliodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 to improve cycle life.

Chemical Formula 2

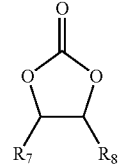

In Chemical Formula 2, $R_7$ and $R_8$ are the same or different and may be each independently hydrogen, a halogen, a cyano group (CN), a nitro group ($NO_2$), or a C1 to 05 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not both (e.g., simultaneously) hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate or fluoroethylene carbonate, and the like. The amount of the additive for improving cycle life may be flexibly used within a suitable or appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example an integer ranging from 1 to 20), LiCl, LiI, and $LiB(C_2O_4)_2$ (lithium bis(oxalato) borate; LiBOB). The lithium salt may be used in a concentration of about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 is an schematic perspective view showing a rechargeable lithium battery according to one embodiment. The rechargeable lithium battery according to one embodiment is illustrated to have for example a prismatic shape, but the present disclosure is not limited thereto and the rechargeable lithium battery may have various suitable shapes such as a cylinder, a pouch, and/or the like.

Referring to FIG. 1, a rechargeable lithium battery 100 according to one embodiment includes an electrode assembly 40 formed by placing a separator 30 between a positive electrode 10 and a negative electrode 20 and winding the same, and the electrode assembly 40 in a case 50. The electrolyte solution is impregnated in the positive electrode 10, the negative electrode 20, and the separator 30.

Hereinafter, examples of the present disclosure and comparative examples are described. These examples, however, are not in any sense to be interpreted as limiting the scope of the present disclosure.

Example 1

A mesocarbon micro bead and petroleum pitch were mixed in a weight ratio of 98.5:1.5.

The mixture was heat-treated at 2200° C. under a condition blocked from oxygen for 24 hours, preparing a negative active material in which the surface of the mesocarbon micro bead was coated with the pitch.

Comparative Example 1

A negative active material was prepared according to the same method as described with respect to Example 1 except for performing the heat treatment at 1150° C.

Comparative Example 2

A negative active material was prepared according to the same method as described with respect to Comparative Example 1 except for mixing the mesocarbon micro bead and the petroleum pitch in a weight ratio of 99.5:0.5.

BET Measurement

The specific surface areas of the negative active materials according to Example 1 and Comparative Example 1 were measured in a BET method using a nitrogen adsorption, and the results are provided in Table 1.

TABLE 1

|  | BET (m²/g) |
| --- | --- |
| Example 1 | 0.7 |
| Comparative Example 1 | 0.8 |
| Comparative Example 2 | 1.3 |

As shown in Table 1, the negative active materials of Example 1 and Comparative Example 1 had a BET specific surface area of less than or equal to 1 $m^2/g$, but the negative active material of Comparative Example 2 had a little higher specific surface area of 1.3 $m^2/g$.

Raman Intensity Ratio

A Raman spectrum of the negative active materials prepared according to Example 1 and Comparative Examples 1 and 2 were measured by using an argon ion laser light source at a wavelength of 514 nm with a laser under power of 0.1 mW and for the exposure time of 60 seconds and a Raman spectrum was obtained by using a Raman spectrometer (NRS 1000, Jasco Inc.).

The obtained Raman spectrum was used to calculate an integral area ratio between a D peak (about 1350 $cm^{-1}$ to to about 1370 $cm^{-1}$) a G peak (about 1570 $cm^{-1}$ to about 1620 $cm^{-1}$), and the results are provided in Table 2.

TABLE 2

|  | D/G |
| --- | --- |
| Example 1 | 0.08 |
| Comparative Example 1 | 0.40 |
| Comparative Example 2 | 0.30 |

As shown in Table 2, Example 1 and Comparative Example 2 showed an area ratio (D/G) of less than or equal to 0.3, while Comparative Example 1 showed a high area ratio (D/G) of 0.40.

High Temperature Cycle-Life Characteristics 97.5 wt % of each negative active material prepared according to Example 1 and Comparative Examples 1 and 2 were respectively mixed with 1 wt % of carboxyl methyl cellulose, and 1.5 wt % of styrene-butadiene rubber in water as a solvent, thereby preparing negative active material slurries each including a respective one of the negative active materials prepared according to Example 1 and Comparative Examples 1 and 2.

Each negative active material slurry was coated on a respective Cu foil and then, dried and compressed, thereby manufacturing a negative electrode.

Each negative electrode was used to manufacture a respective rechargeable lithium battery cell having an active mass density of 1.70 g/cc, a current density of 4.0 mAh/cm², and a theoretical capacity (nominal capacity) of 2000 mAh (1 C). Herein, a positive electrode including $LiCoO_2$, and an electrolyte which was prepared by dissolving 1 M $LiPF_6$ in a mixed solvent of ethylene carbonate and dimethyl carbonate (3:7 of a volume ratio) were used.

Figure 2:
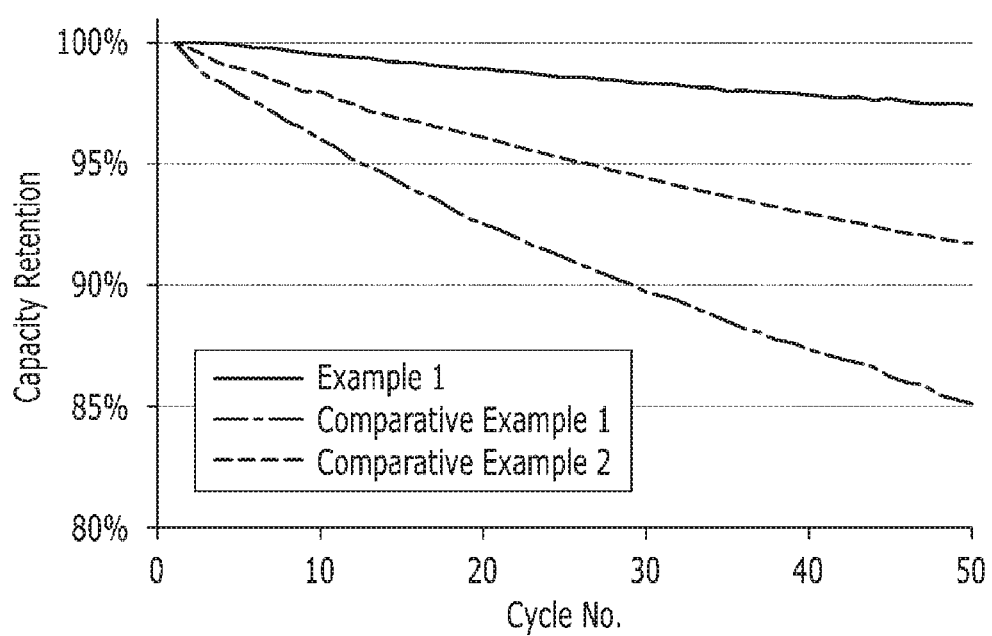
FIG. 2 is a graph showing high temperature cycle-life characteristics of rechargeable lithium battery cells manufactured using the negative active materials prepared according to Example 1 and Comparative Examples 1 and 2.

Each battery cell was charged and discharged at 45° C. under a condition of 1.0 C. The cut-off condition of the charge and discharge was as follows. The battery cell was constant current/constant voltage charged under a cut-off condition of 4.35 V, paused for 5 minutes, then, constant current discharged under a cut-off condition of 3.0 V, and then, paused again for 5 minutes. This charge and discharge process was regarded as a one charge and discharge cycle and 50 times repeated. FIG. 2 shows a ratio (capacity retention) of discharge capacity at each charge and discharge cycle relative to discharge capacity at the first charge and discharge cycle. As shown in FIG. 2, a battery cell using the negative active material having a specific surface area of less than or equal to 1 $m^2/g$ and a Raman spectrum area ratio (D/G) of less than or equal to 0.3 prepared according to Example 1 showed the most excellent high temperature cycle-life maintenance rate. On the contrary, a battery cell using the negative active material having a low specific surface area of 0.8 $m^2/g$ but a high Raman spectrum area ratio (D/G) of 0.40 prepared according to Comparative Example 1 and a battery cell using the negative active material having a low Raman spectrum area ratio (D/G) of 0.3 but a high specific surface area of 1.3 $m^2/g$ prepared according to Comparative Example 2 showed deteriorated high temperature cycle-life characteristics.

In the present disclosure, it will be understood that when an element or layer is referred to as being "on" another element or layer, it can be directly on the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims, and equivalents thereof.

What is claimed is:

1. A negative active material for a rechargeable lithium battery, the negative active material comprising:
 a pitch-coated crystalline carbon-based material, and the negative active material having a specific surface area of about 0.1 $m^2/g$ to about 1 $m^2/g$, and having an area ratio D/G of a D peak at about 1350 $cm^{-1}$ to about 1370 $cm^{-1}$ and a G peak at about 1570 $cm^{-1}$ to about 1620 $cm^{-1}$ of about 0.03 to about 0.3 in a Raman spectrum analysis,
 wherein a ratio of the carbon-based material to the pitch is 99:1 to 95:5.

2. The negative active material of claim 1, wherein the crystalline carbon-based material comprises-artificial graphite.

3. A negative electrode for a rechargeable lithium battery comprising the negative active material of claim 1.

4. A rechargeable lithium battery comprising:
 the negative electrode of claim 3;
 a positive electrode comprising a positive active material; and
 an electrolyte.

5. The negative active material of claim 1, wherein the ratio of the carbon-based material to the pitch is 99:1 to greater than 95:less than 5.

* * * * *